United States Patent Office 3,034,951
Patented May 15, 1962

---

3,034,951
S - [O,O - DIALKYLPHOSPHOROTHIOMETHYL]-S'-ALKYLTRITHIOCARBONATES AND THEIR METHODS OF PREPARATION AND USE AS PESTICIDES
Edward N. Walsh, Chicago Heights, Ill., and John G. Brady, Campbell, Calif., assignors to Stauffer Chemical Company, New York, N.Y., a corporation of Delaware
No Drawing. Filed Aug. 4, 1960, Ser. No. 47,367
14 Claims. (Cl. 167—22)

This invention is directed to a new group of trithiocarbonates, their methods of preparation and use as pesticides. The compounds of this invention are characterized by the following general formula:

wherein R and R' stand for the same or different lower alkyl groups and X stands for either oxygen or sulfur.

Many phosphorus containing compounds for combating fungi, insects and other diminutive pests are presently available. Because some strains of pests have an inherent capacity for self-immunization after prolonged exposure to specific compounds and because none of the known compounds are applicable to all phases of pesticidal use to give the ultimate in desired results, there continues to be a need for new compounds, especially those which exhibit a high degree of activity. The compounds of this invention are highly effective in killing mites, nematodes, and various species of insects. In addition, they exhibit a low level of phytotoxicity coupled with fungicidal activity making them suitable for application directly to growing plants, thereby simultaneously protecting against fungus growths and attack by insects.

The S-[O,O-dialkylphosphorothiomethyl]-S' - alkyltrithiocarbonates of this invention may be prepared by reaction between sodium alkyl trithiocarbonates and O,O-dialkyl-S-chloromethylphosphorothioates, or by reaction between chloromethyl alkyl trithiocarbonates and S-sodium O,O-dialkylphosphorothioates. These two types of reactions are exemplified by the following general equations:

(1) 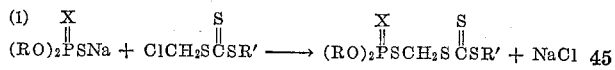

(2) 

where R, R' and X are as defined above. Except for chloromethyl alkyl trithiocarbonate shown in the first equation, all of the classes of reactants as well as their methods of preparation are known. In addition, the reactants are not precisely limited to those shown in the above equations, since in general, the various halogens are suitable where chlorine is shown and the alkali metal analogs may be substituted for the shown sodium compounds. Chloromethyl alkyl trithiocarbonate may be conveniently prepared by reacting $BrCH_2Cl$ with sodium alkyl trithiocarbonate. Both reactions may be accelerated by heating, and the temperature need not be controlled rigidly during reaction. Purification and concentration of the viscous, orange-yellow liquid products of this invention may be accomplished by washing with a suitable base such as sodium hydroxide and evaporating the solvent.

The following examples serve to illustrate desirable methods for preparing the compounds of this invention, however, no limitation to any specific method is intended.

EXAMPLE 1

To 18.0 grams of sodium ethyl trithiocarbonate contained in 150 ml. of acetone was added 21.8 grams of O,O-diethyl-S-chloromethyl phosphorothioate. This mixture was warmed to reflux for 21 hours, after which the NaCl formed in the reaction precipitated out. The mixture was then cooled and the NaCl removed by filtration. The filtrate was concentrated by volatilizing the acetone to 60° C. at 2 mm. Hg. Residual product material was dissolved in 200 ml. of ethyl ether, washed with N/6 NaOH, and dried with $Na_2SO_4$. The product was then reconcentrated by evaporating ether to 72° C. at 2 mm. Hg. The 17.1 gram product was determined to be S-[O,O-diethylphosphorothiomethyl]-S'-ethyl trithiocarbonate and showed an index of refraction $N_D^{25}=1.5622$. Analysis of the product composition showed 8.7% P and 41.9% S compared with the theoretical composition of 9.7% P and 40.0% S.

EXAMPLE 2

The chloromethyl butyl trithiocarbonate reactant required was first prepared as follows: 38.7 grams of $BrCH_2Cl$ were dissolved in 200 ml. of acetone and this solution was added to 29.1 grams of sodium butyl trithiocarbonate while stirring and maintaining the temperature below 30° C. The mixture was refluxed for about 25 hours after which it was filtered to remove NaBr (12.0 grams) and concentrated by solvent evaporation to 40° C. at 2 mm. Hg. The 34.5 grams of concentrate remaining were distilled to yield 24.5 grams chloromethyl butyl trithiocarbonate having a refractive index $N_D^{25}=1.6304$ and a composition of 15.0% Cl (theory 16.5) and 42.2% S (theory 44.8%).

10.8 grams of this cholormethyl butyl trithiocarbonate was added to a solution containing 9.0 grams of S-sodium O,O-dimethylphosphorodithioate in 50 ml. of acetone while stirring and maintaining a temperature of 7–20° C. After complete addition the mixture was permitted to stand for 20 hours at room temperature during which time NaCl precipitated out. The NaCl was then removed by filtration and the filtrate concentrated by solvent evaporation to 60° C. at 1.5 mm. Hg. Tests of the concentrate revealed incomplete reaction and the concentrate was then added to 200 ml. of acetone and refluxed overnight. Thereafter a second concentrate was prepared by evaporation to 60° C. at 2 mm. Hg and was found to be completely reacted. The second concentrate weighed 15.7 grams and was determined to be S-[O,O-dimethylphosphorodithiomethyl]-S'-butyl trithiocarbonate with an analysis of 9.2% P and 46.5% S compared with the theoretical composition of 9.2% P and 47.6% S.

EXAMPLE 3

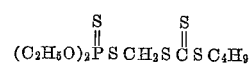

To 19.5 grams of sodium butyl trithiocarbonate in 100 ml. acetone was added 23.5 grams of O,O-diethyl-S-chloromethylphosphorothioate. The mixture was heated for four hours while refluxing, then cooled and treated with 1 cc. of pyridine. The mixture was reheated and refluxed for six hours. Thereafter, 500 ml. of water was added and the mixture cooled. The oily phase was separated, dissolved in ethyl ether, washed twice with 100 ml. portions of 5% NaOH, dried with $Na_2SO_4$, and then concentrated by solvent evaporation to yield 26.0 grams (71% yield) of S-[O,O-diethylphosphorodithiomethyl]-S' - butyl trithiocarbonate. This material was a viscous, orange-yellow liquid having a refractive index $N_D^{25}=1.5775$. Analysis showed it to be 7.3% P (theory 8.5%) and 43.8% S (theory 43.9%).

EXAMPLE 4

23.4 grams of O,O-diethylchloromethylphosphorodithioate was added to 16.0 grams of sodium ethyl trithiocarbonate in 100 ml. of acetone. This mixture was heated and refluxed for one hour and thereafter filtered to remove the NaCl precipitate. The filtrate was poured into 500 ml. $H_2O$ and the organic constituent was extracted therefrom with 250 ml. ethyl ether. The ether solution was washed with 100 ml. of N/10 NaOH and then dried and concentrated by solvent evaporation to 60° C. at 1 mm. Hg. The concentrated residue weighed 25.0 grams, had a refractive index $N_D^{25}=1.5964$, and analyzed 7.6% P and 47.0% S.

EXAMPLE 5

26.2 grams of O,O-diisopropylchloromethylphosphorodithioate was added to a solution of 16.0 grams sodium ethyl trithiocarbonate in 100 cc. acetone. The mixture was refluxed for two hours, cooled, and then poured into 500 ml. of $H_2O$. The resulting organic phase was extracted with 200 cc. ethyl ether, dried over $Na_2SO_4$ and concentrated by evaporation to 60° C. at 1 mm. Hg. A yield of 26.0 grams (71.5% theory) of a viscous, orange-yellow liquid having a refractive index $N_D^{25}=1.5930$ was obtained. An analysis showed the composition to be 7.0% P and 46.2% S.

For determining miticidal activity the viscous, oily compounds of this invention were mixed with the proper solvent, such as acetone, to form solutions capable of being sprayed. The final concentration is made up in "wet water." Wet water is made according to the following formula:

Vatsol (sulfonate-type wetting agent) \_\_\_\_grams\_\_ 2.5
Methocel (methyl cellulose) _____do\_\_\_\_ 1.0
Water _____liters\_\_ 20

This mixture contains 0.125% Vatsol and 0.005% Methocel as wetters and dispersants. The use of this suspension allows for a more thorough and rapid wetting and higher retention of the toxicant solution on the insect cuticle than could be obtained with water alone.

Young pinto bean plants in the primary leaf stage were used as the host plant for the mites. These bean plants were infested with several hundred, two-spotted mites, *Tetranychus telarius*. Infested plants were sprayed to run-off with the test suspension. The sprayed plants were transferred to a greenhouse and held for fourteen days. The fourteen day reading is necessary for evaluating ovicidal action. The results are expressed in terms of percent mortality of post-embryonic and embryonic forms.

The following table shows the results of such tests:

*Table I.—Percent Mortality of Two-Spotted Mites, Tetranychus telarius*

| Sample | Concentration of Active Material, Percent | Post Embryonic Kill—14 days, Percent | Egg Kill—14 days, Percent |
|---|---|---|---|
| Compound of Example 3 | 0.25 | 100 | 100 |
| Compound of Example 4 | 0.25 | 100 | 100 |
| Compound of Example 5 | 0.25 | 95 | 75 |

No phytotoxicity was observed from any of the above tests.

A series of tests was accomplished with various species of insects retained in small screen cages by spraying these insects with dilute solutions containing 0.1% of the active compounds. After 24 hours and again at 72 hours, to allow sufficient time for the full effect of the compound, a count was made of the living and dead insects.

The following table summarizes the results obtained:

*Table II.—Percent Mortality of Insects in Screening Tests*

| Sample | M. domestica, Percent Kill | P. americana, Percent Kill | O. fasciatus, Percent Kill | T. confusum, Percent Kill |
|---|---|---|---|---|
| Compound of Example 1 | 100 | 40 | 100 | 80 |
| Compound of Example 3 | 100 | 60 | 0 | 5 |
| Compound of Example 4 | 100 | 60 | 20 | 0 |
| Compound of Example 5 | 44 | 0 | 0 | 10 |

Fungicidal activity was determined by spraying pinto bean plants with aqueous solutions or suspensions containing various concentrations of the compounds of this invention. The plants were then exposed to infection by spraying with rust spores or placing near bean plants infected with mildew. The results of these tests are given below.

*Table III.—Prevention of Rust and Mildew Infection*

| Sample | Concentration of Toxic Material, Parts/Million | Rust, Percent control | Mildew, Percent control |
|---|---|---|---|
| Compound of Example 3 | 1,000 | 0 | 75 |
|  | 500 | 0 | 50 |
|  | 100 | 0 | 0 |
| Compound of Example 4 | 1,000 | 75 | 100 |
|  | 500 | 25 | 100 |
|  | 100 | 0 | 50 |
| Compound of Example 5 | 1,000 | 50 | 100 |
|  | 500 | 0 | 75 |
|  | 100 | 0 | 50 |

The compounds of Examples 2–5 were tested for activity in killing larval forms of the root-knot nematode and were found to be effective. The compounds were tested in soil and showed 100% kill at 110 parts per million concentrations without any observable phytotoxic effect.

The systemic properties of the toxic compounds of this invention were tested by the following method. Two hundred milliliters of the test solution were made with different concentrations of active material, for example 100 and 50 parts per million. The roots of bean plants were placed in these solutions and the leaves were infested with two-spotted mites. After seven to fourteen days, mortality readings were taken to determine the activity of the test compound.

*Table IV.—Systemic Control of Two-Spotted Mites, Tetranychus telarius, at Fourteen Days*

| Sample | Concentration of Active Material, Parts/Million | Post-Embryonic, Percent Kill | Eggs, Percent Kill |
|---|---|---|---|
| Compound of Example 1 | 50 | 100 | 100 |
| Compound of Example 3 | 100 | 100 | 100 |
| Compound of Example 4 | 100 | 100 | 100 |
| Compound of Example 5 | 100 | 0 | 0 |

The term "pesticidal" is used herein to define the toxic effects of the compounds of this invention upon various species of mites, aphids, fungi, spiders, nematodes, insects, and similar organisms.

Preparation of insecticidal and pesticidal compositions from the compounds of this invention usually involves admixture with adjuvants such as dusts, solvents, wetting, dispersing, and emulsifying agents. The toxic material may be applied as a solution in suitable solvents, such as acetone and the like, or can be mixed with inert dust and applied as a powder.

What we claim is:

1. The compound represented by the formula:

wherein R and R' are lower alkyl groups and X is a member selected from the group consisting of oxygen and sulfur.

2. The compound represented by the formula:

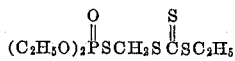

3. The compound represented by the formula:

4. The compound represented by the formula:

5. The compound represented by the formula:

6. The compound represented by the formula:

7. A method for killing pests which comprises contacting the pests with a pesticidal amount of at least one compound represented by the formula:

wherein R and R' are lower alkyl groups and X is a member selected from the group consisting of oxygen and sulfur.

8. A method in accordance with claim 7 wherein said compound is S-[O,O-diethylphosphorothiomethyl]-S'-ethyl trithiocarbonate.

9. A method in accordance with claim 7 wherein said compound is S-[O,O-dimethylphosphorodithiomethyl]-S'-butyl trithiocarbonate.

10. A method in accordance with claim 7 wherein said compound is S-[O,O-diethylphosphorodithiomethyl]-S'-butyl trithiocarbonate.

11. A method in accordance with claim 7 wherein said compound is S-[O,O-diethylphosphorodithiomethyl]-S'-ethyl trithiocarbonate.

12. A method in accordance with claim 7 wherein said compound is S-[O,O-disopropylphosphorodithiomethyl]-S'-ethyl trithiocarbonate.

13. A method of making a compound having the formula:

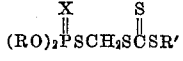

wherein R and R' are lower alkyl groups and X stands for a member selected from the group consisting of oxygen and sulfur which comprises reacting an alkali metal lower alkyl trithiocarbonate with an O,O-di(lower alkyl)-S-halomethylphosphorothioate.

14. A method of making a compound having the formula:

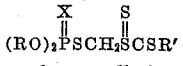

wherein R and R' are lower alkyl groups and X stands for a member selected from the group consisting of oxygen and sulfur which comprises reacting a halomethyl lower alkyl trithiocarbonate with an S-alkali metal O,O-di(lower alkyl) phosphorothioate.

References Cited in the file of this patent

UNITED STATES PATENTS

| | | |
|---|---|---|
| 2,668,822 | Tolkmith | Feb. 9, 1954 |
| 2,891,059 | Malz | June 16, 1959 |
| 2,915,429 | Scherer | Dec. 1, 1959 |
| 2,920,993 | Fairchild | Jan. 12, 1960 |